May 7, 1929.  R. B. TAYLOR  1,712,126
TRIMMING TABLE
Filed Dec. 14, 1926   2 Sheets-Sheet 1

INVENTOR.
Robert B. Taylor
BY Townsend, Loftus & Hett
ATTORNEYS.

May 7, 1929.  R. B. TAYLOR  1,712,126

TRIMMING TABLE

Filed Dec. 14, 1926  2 Sheets-Sheet 2

INVENTOR.
Robert B. Taylor
BY
Townsend, Loftus & Abbett
ATTORNEYS.

Patented May 7, 1929.

1,712,126

UNITED STATES PATENT OFFICE.

ROBERT BROOKS TAYLOR, OF KAPAA, KAUAI, TERRITORY OF HAWAII, ASSIGNOR TO HAWAIIAN CANNERIES COMPANY, LTD., OF KAPAA, KAUAI, TERRITORY OF HAWAII, A CORPORATION OF HAWAII.

TRIMMING TABLE.

Application filed December 14, 1926. Serial No. 154,703.

This invention relates to cannery machinery, and particularly pertains to a trimming or peeling table.

At the present time in cannery operations it is customary to prepare fruit for canning by hand peeling or trimming, as for example in the preparation of pineapples where it is necessary to inspect the pineapples and remove imperfections therefrom after they have been cut into cylindrical shape and their cores have been removed. This operation is usually performed by persons skilled in trimming the fruit, which fruit is usually delivered to the trimming tables on endless conveyors. The use of endless conveyors has of necessity made it probable that the fruit will be injured as they travel along the conveyors and when they are held in check on the conveyors and in front of the trimming tables. It is also necessary that the operator shall pick up the fruit for trimming and in doing so the fruit is often squeezed and mashed so that it cannot be used as first grade fruit. Other objections to this method of operation is the possibility of unsanitary conditions on the conveyor, the large amount of space required for the trimming tables and the lack of convenience in the feed and irregular trimming operations.

It is the principal object of the present invention, therefore, to provide a trimming table which will continuously present articles to be trimmed or peeled to the trimming operators without possibility that the articles will be damaged by the conveyors on which they are carried and while making it possible for the articles to be continuously passed by the trimming operators without difficulty and without regard to the number of pieces of fruit which are removed from the delivery devices for trimming. Further advantages of the present invention are the possibilities for complete sanitation of the structure, the small space required for the trimming table, delivery devices and the operators, the convenience in feed and the convenience in operation which may be carried on irrespective of the delivery periods of fruit.

The invention is illustrated by way of example in the accompanying drawings in which Figure 1 is a view in perspective showing the complete machine with which the present invention is concerned and the manner in which the articles of fruit may be removed from the delivery devices.

Figure 3:
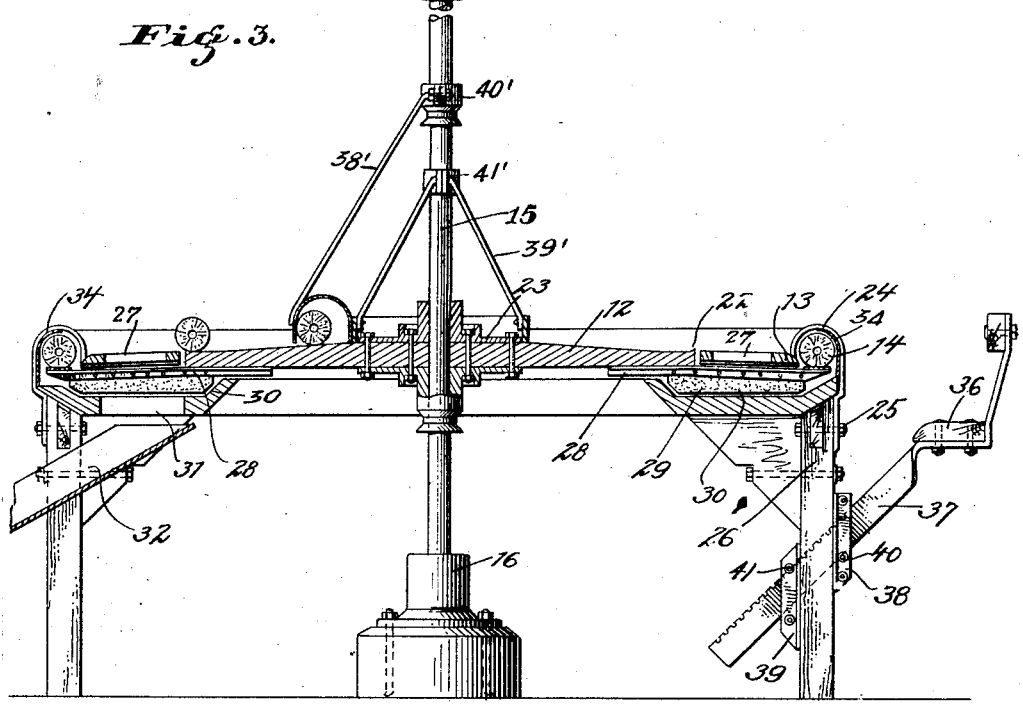
Figure 3 is a view in central vertical section through the trimming table showing the moving and stationary elements and the manner in which the articles of fruit are carried thereby.

Referring more particularly to the drawings: 10 indicates a feed chute leading from some type of fruit preparing device, it being understood that the present invention may be applicable for use in the preparation of various fruits for canning, but that the drawings show it used by way of example in the preparation of pineapples. The chute 10 in the present instance leads from a pineapple cutting machine of the general type known as the "Ginaca" machine, in which the pineapple is cut longitudinally into cylinders and the core is punched out, leaving a central cylindrical opening lengthwise of the cylinder. The fruit thus shaped travels endwise down the chute 10 and to the trimming table 11. This table is formed in three complementary units, a central rotary unit 12 onto which the fruit is delivered from the chute 10, a circumscribing fixed trimming table 13 and a surrounding travelling conveyor 14 for receiving the trimmed fruit. The central delivery table 12 is disposed horizontally and is fixed upon a vertical shaft 15. This shaft is mounted at its lower end in a suitable thrust bearing 16 and at its upper end in a suitable bearing 17. The shaft is fitted with a worm gear 18 at its upper end and this gear is in mesh with a worm pinion 19 driven by shaft 20. The shaft 20 may be directly connected with a driving motor or may be driven through a belt and a pulley 21 as indicated in Figure 3 of the drawing.

The upper surface of the table 12 is convex to a point near its outer edge, where a raised margin 22 is formed to hold the articles of fruit upon the delivery table 12, even though the table is rotating and some centrifugal action is set up in the fruit due to this rotation.

Mounted around the shaft 15 near its center is a hub flange 23 which is concentrically positioned with relation to the hub so that when articles of fruit are delivered from the chute 10 onto the table and alongside the hub the fruit will be given an outward motion while striking the hub flange 23 and will gradually roll outwardly over the convex face of the delivery table 12 to the edge of the table where it will be temporarily carried as indicated at *a* in Figure 1. Circumscribing the rotary delivery table 12 is the fixed trimming table 13. This table is rigidly supported in a slightly inclined horizontal position upon overhanging arms 24 which extend outwardly and downwardly and are secured by bolts 25 to this superstructure of the table, which includes the legs 26. Formed at intervals through the trimming table and symmetrically spaced around the table are trimming openings 27 through which the discarded trimmings may fall and may thereafter be carried away in a manner which will be presently described.

Figure 2:
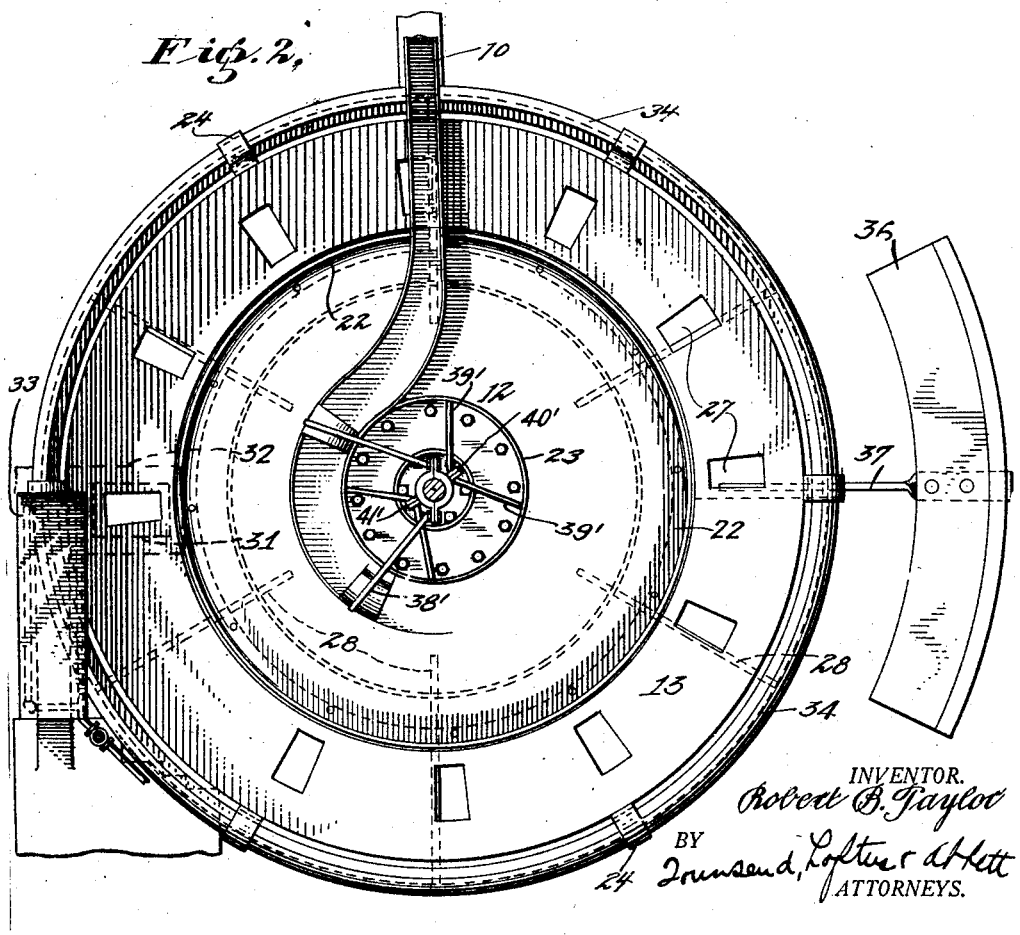
Figure 2 is a view in plan showing the complete trimming table with which the present invention is concerned.

Extending beneath the fixed trimming table 13 are radial arms 28 which are secured to the delivery table 12 and move therewith. There are a plurality of these arms as indicated by dotted lines in Figure 2 of the drawing. These arms carry scraper blades 29, commonly known as "squeegee" blades. These blades extend downwardly into a fixed circular trough 30, which is disposed beneath the trimming table and also beneath the outer portion of the delivery table and the final feed conveyor 14. By this means the trimmings and the fruit juices will be gathered beneath the trimming table and will be continuously carried away. An opening 31 is formed through the trough 30 at one point in its floor to permit the refuse material to be ejected from the trough and delivered to a drain chute 32.

Figure 4:
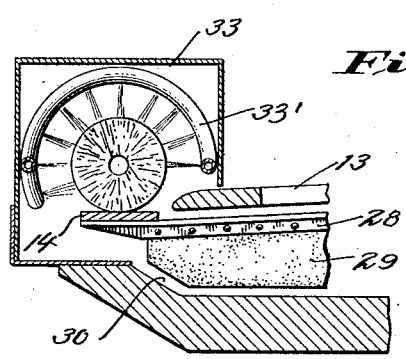
Figure 4 is an enlarged view in transverse section, disclosing the means by which the articles of fruit are washed after they leave the trimming table and are delivered to other cannery machinery.

Circumscribing the circular trimming table 13 is a circular final conveyor 14. This conveyor is in the shape of a ring supported upon the outer ends of the radial arms 28 and at a level slightly lower than that of the trimming table 13. This conveyor receives the trimmed fruit and carries it around to a discharge device 33. A retaining wall 34 circumscribes the complete trimming table and the outer conveyor 14 and tends to hold the fruit onto the outer conveyor 14 in the event that there is a tendency for it to be thrown off. The discharge device 33 is disposed tangentially to the path of travel of the fruit on the discharge conveyor 14 so that the fruit will pass into this conveyor and then be delivered to suitable canning machinery such for example as a slicer. Mounted within the discharge device 33 are spray tubes 33', as indicated in the enlarged view of Figure 4. This acts to wash the fruit on all sides and will thus not only cleanse it from extraneous dirt, but will also free it from small trimmings which have adhered thereto.

By reference to Figure 3 of the drawings it will be noted that the outer lip of the delivery table 12 and the plane surface of the trimming table 13 are in substantially the same horizontal plane. It will be further evident that the outer edge of the trimming table 13 is slightly bevelled and that the supporting surface of the conveyor 14 is on a lower plane than the plane of the table, thus making it possible for the cylindrically shaped fruit to be readily rolled from one of the tables to the other without necessitating that the operator shall pick up the fruit and mutilate it.

Mounted at suitable points around the table are working benches, 36, carried by an adjustable support 37. This support extends inwardly and downwardly beneath the table and through guide members 38 and 39 mounted upon the legs 26 of the table. Pins 40 and 41 are carried by each of the guide members and form a lock for the member 37 which extends between them. The upper edge of the supporting member 37 is serrated and the serrations may be brought to register with the pin 41 so that the bench may be disposed at the desired height.

Figure 1:
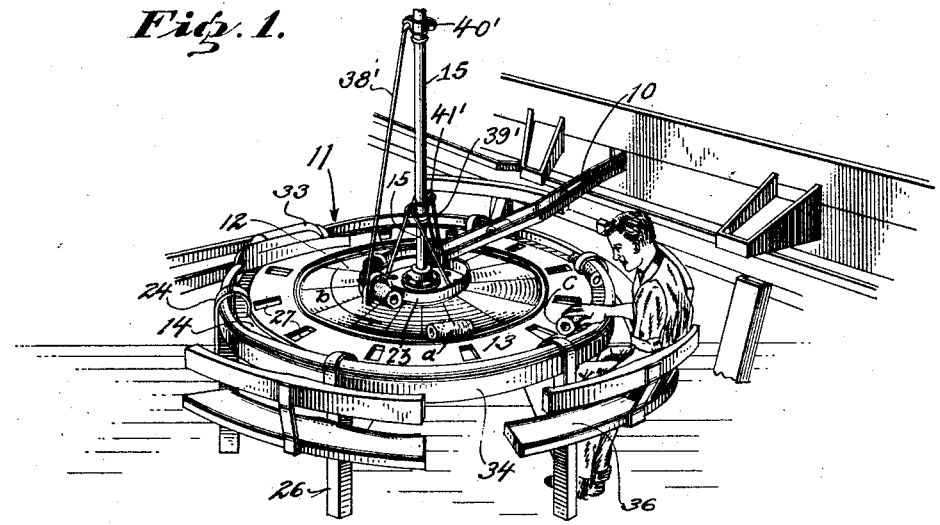

By reference to Figures 1 and 3, it will be seen that the lower end of the chute 10 and the hub flange 23 are supported by hangers 38' and 39' respectively, which are mounted upon sleeves 40' and 41' resting on collars carried by the shaft 15. In this manner the table is free to move beneath the hub flange 23 and the curved end of the chute. After the fruit has been properly prepared for delivery to the trimming table, it is placed in the chute 10 and allowed to travel down the chute to the arcuate portion circumscribing the hub flange 23. The bottom of the chute 10 is opened along its length circumscribing the hub flange 23 so that the fruit is disposed directly on the delivery table 12 in an endwise movement. As the delivery table rotates in the direction of the arrow *b*, as indicated in Figure 1, the fruit will be carried circumferentially along the flange 22 and will be forced outwardly by this flange, as well as the centrifugal action set up by the rotation of the table. The cylindrical articles of fruit will then roll outwardly and accumulate around the edge of the table 23 and will be held onto the table by the outer rim or lip 22. In this manner it will be seen that a substantially continuous row or stream of the articles to be trimmed will be carried upon the table end to end but that they will be motionless with relation to the table after having come to rest along the outer edge thereof and will therefore be carried without possibility of bruising, mashing or other damage which might be done by frictional contact between the fruit and a relatively moving table or conveyor. The continuous stream of fruit will thus be continuously presented to the operators who are seated at the benches around the trimming table and it is possible for them to instantly roll one of the articles of fruit off of the delivery table 12 and onto the trimming table 13. This operation is clearly indicated at "c" in Figure 1. The fruit may thus rest upon the table and may be readily manipulated by the trimming operator without necessitating that it shall be picked up and mashed or bruised in the handling operation. As the fruit is trimmed, the trimmings may be dropped through the openings 27 in the trimming table and into the circular trough or launder 30. The fruit may then be rolled outwardly over the lip of the stationary trimming table 13 and deposited upon the final conveyor 14. Here it will be carried along a circular path of travel until it encounters the discharge device 33. The fruit will then pass endwise through this discharge device and will pass through a spray of water. In the meantime, the trimmings which have fallen in the launder 30 will be caught by the moving blades 29 and forced forwardly to the discharge opening 31.

It will thus be seen that by the structure here disclosed it is possible to rapidly deliver articles of fruit to a trimming table and to carry them therefrom and to provide means whereby the fruit may be trimmed without being lifted from the table and without being thus bruised or damaged and a complete structure which is convenient in its operation, sanitary and efficient.

While I have shown the preferred form of my invention, as now known to me, it will be understood that various changes may be made in the combination, construction and arrangement of parts without departing from the spirit of the invention as claimed.

Having thus described my invention, what I claim and desire to secure by Letters Patent is—

1. A device of the character described, comprising a circular rotary table disposed in a substantially horizontal plane and a fixed circumscribing working table extending around the rotary table, and an annular conveying member circumscribing the fixed working table in substantially the same horizontal plane with the rotating table and the fixed table and moving around the axis of the rotary table whereby articles placed upon the circular rotating table may be rolled from table to table during the rotation of the circular and annular tables.

2. A device of the character described, comprising a horizontally disposed circular rotary table, a fixed working table circumscribing said rotary table and being disposed on substantially the same plane therewith, a final conveying device circumscribing the fixed working table, said conveying device being secured to the rotary table and moving in unison therewith.

3. A device of the character described, comprising a horizontally disposed circular rotary table, a fixed working table circumscribing said rotary table and being disposed on substantially the same plane therewith, a final conveying device circumscribing the fixed working table, said conveying device being secured to the rotary table and moving in unison therewith, and means for delivering articles onto the rotary table at a point near its center whereby articles will be carried with the rotary table during its movement.

4. A device of the character described, comprising a horizontally disposed circular rotary table, a fixed working table circumscribing said rotary table and being disposed on substantially the same plane therewith, a final conveying device circumscribing the fixed working table, said conveying device being secured to the rotary table and moving in unison therewith, and means for delivering articles onto the rotary table at a point next to its center whereby articles will be carried with the rotary table during its movement, and means for receiving articles deposited onto the final circumscribing conveyor.

5. A device of the character described, comprising a horizontally disposed circular rotary table, a fixed working table circumscribing said rotary table and being disposed on substantially the same plane therewith, a final conveying device circumscribing the fixed working table, said conveying device being secured to the rotary table and moving in unison therewith whereby articles may be readily rolled across the various tables to feed conveying device, and means for delivering articles onto the rotary table at a point near its center whereby articles will be carried with the rotary table during its movement.

6. A device of the character described, comprising a horizontally disposed circular continuously rotating table, a circumscribing annular working table disposed around the rotary table and in substantially the plane thereof, said working table being formed with openings at intervals through its top, a circular trough beneath the working table to receive material which may drop through the openings therein, and means carried by the rotary table and extending beneath the working table whereby the material in the trough will be scraped and discharged therefrom, and a circumscribing final conveyor positioned around the working table and fixed to move in unison with the rotary table.

7. A device of the character described, comprising a horizontally disposed circular continuously rotating table, a circumscribing annular working table disposed around the rotary table and in substantially the plane thereof, said working table being formed with openings at intervals through its top, a circular trough beneath the working table to receive material which may drop through the openings therein, and means carried by the rotary table and extending beneath the working table whereby the material in the trough will be scraped and discharged therefrom, and a circumscribing final conveyor positioned around the working table and fixed to move in unison with the rotary table, and a retaining ledge circumscribing the final conveyor whereby articles deposited on the final conveyor will be caused to travel in a circular path in unison therewith.

8. A device of the character described, comprising a horizontally disposed circular continuously rotating table, a circumscribing annular working table disposed around the rotary table and in substantially the plane thereof, said working table being formed with openings at intervals through its top, a circular trough beneath the working table to receive material which may drop through the openings therein, and means carried by the rotary table and extending beneath the working table whereby the material in the trough will be scraped and discharged therefrom, and a circumscribing final conveyor positioned around the working table and fixed to move in unison with the rotary table, and a retaining ledge circumscribing the final conveyor whereby articles deposited on the final conveyor will be caused to travel in a circular path in unison therewith, and means for delivering articles onto the table adjacent its center.

9. A device of the character described, comprising a horizontally disposed circular continuously rotating table, a circumscribing annular working table disposed around the rotary table and in substantially the plane thereof, said working table being formed with openings at intervals through its top, a circular trough beneath the working table to receive material which may drop through the openings therein, and means carried by the rotary table and extending beneath the working table whereby the material in the trough will be scraped and discharged therefrom, and a circumscribing final conveyor positioned around the working table and fixed to move in unison with the rotary table, and a retaining ledge circumscribing the final conveyor whereby articles deposited on the final conveyor will be caused to travel in a circular path in unison therewith, and means for delivering articles onto the table adjacent its center.

10. A device of the character described, comprising a circular horizontally disposed table, the upper face of which is convexed, a retaining ledge formed around the periphery of said rotary table, means for continuously driving the table, means for depositing articles upon the table adjacent its center, and a horizontally disposed stationary working table circumscribing the rotary table and being in substantially the same horizontal plane therewith, and a final conveyor circumscribing the working table and fixed to move in unison with the rotary table.

11. A device of the character described comprising a series of concentrically arranged circular tables disposed in substantially the same horizontal plane, the innermost of said tables and the outermost of said tables moving in unison in said plane, and an intervening table being fixed with relation thereto and filling the space between the two moving tables whereby an article may freely roll from a point of delivery on the innermost table and across the fixed table to the outermost table, means for delivering artices to a point adjacent the center of the innermost table, means for ejecting articles from the outermost table and means for retarding the outward movement of the articles from the innermost table onto the fixed table.

ROBERT BROOKS TAYLOR.